United States Patent [19]

Suizu et al.

[11] Patent Number: 5,496,923
[45] Date of Patent: Mar. 5, 1996

[54] PURIFICATION PROCESS OF ALIPHATIC POLYESTER

[75] Inventors: Hiroshi Suizu; Masatoshi Takagi; Masanobu Ajioka; Akihiro Yamaguchi, all of Kanagawa, Japan

[73] Assignee: Mitsui Toatsu Chemicals, Inc., Chiyoda, Japan

[21] Appl. No.: 305,785

[22] Filed: Sep. 14, 1994

[30] Foreign Application Priority Data

Sep. 20, 1993 [JP] Japan .................................. 5-233363
Dec. 22, 1993 [JP] Japan .................................. 5-323762

[51] Int. Cl.$^6$ .................................................. C08F 6/02
[52] U.S. Cl. .................... 528/501; 528/272; 528/274; 528/361; 528/481; 528/491; 528/503; 210/772; 210/773; 210/774; 524/81; 524/401; 524/414; 524/417; 524/418; 524/421
[58] Field of Search ........................ 528/272, 274, 528/361, 481, 487, 491, 501, 503; 210/772, 773, 774; 524/81, 401, 414, 417, 418, 421

[56] References Cited

U.S. PATENT DOCUMENTS

| | | | |
|---|---|---|---|
| 3,629,202 | 12/1971 | Gilkey et al. | 528/486 |
| 4,401,804 | 8/1983 | Wooten et al. | 528/272 |
| 4,960,866 | 10/1990 | Bendix et al. | 528/499 |

FOREIGN PATENT DOCUMENTS

| | | |
|---|---|---|
| 0270987 | 6/1988 | European Pat. Off. . |
| 0368571 | 5/1990 | European Pat. Off. . |
| 0425201 | 5/1991 | European Pat. Off. . |
| 0469520 | 2/1992 | European Pat. Off. . |
| 0522340 | 1/1993 | European Pat. Off. . |
| 572675 | 12/1993 | European Pat. Off. . |
| 62-25121 | 2/1987 | Japan . |
| 62-64824 | 3/1987 | Japan . |
| 63-145327 | 6/1988 | Japan . |
| 63-254128 | 10/1988 | Japan . |
| 3-14829 | 1/1991 | Japan . |
| 4-189823 | 7/1992 | Japan . |
| 4-189822 | 7/1992 | Japan . |
| WO94/07941 | 4/1994 | WIPO . |

OTHER PUBLICATIONS

Database WPI, Week 9236, Derwent Publications Ltd., London, GB; AN 92–295586 (Abstract for JP–A–4,202,428), Jul. 23, 1992.

*Primary Examiner*—Samuel A. Acquah
*Attorney, Agent, or Firm*—Burns, Doane, Swecker & Mathis

[57] ABSTRACT

A purification process of an aliphatic polyester prepared in the presence of a catalyst from a hydroxycarboxylic acid or a cyclic ester of a hydroxycarboxylic acid, or a combination of an aliphatic polyhydric alcohol with an aliphatic polybasic acid, or a mixture of these compounds, comprising deactivating the catalyst while maintaining the aliphatic polyester in a molten or dissolved state, or insolubilizing and separating the catalyst and successively removing low molecular compounds. The process can provide aliphatic polyester which has a low content of unreacted monomers and low molecular weight compounds and is excellent in heat resistance and weatherability.

14 Claims, No Drawings

PURIFICATION PROCESS OF ALIPHATIC POLYESTER

BACKGROUND OF THE INVENTION

1. Field of the Invention

The present invention relates to a purification process of aliphatic polyester which is useful as a biodegradable polymer for substituting medical materials and general purpose resins. More particularly, the invention relates to a purification process of aliphatic polyester in order to obtain aliphatic polyester which scarcely contains unreacted monomers and low molecular weight volatile components.

2. Description of the Related Art

In an aliphatic polyester, polylactic acid can be prepared from a cyclic dimer of lactic acid which is usually called lactide and the preparation process has been disclosed in U.S. Pat. No. 1,995,970, 2,362,511 and 2,683, 136.

A copolymer of lactic acid and other hydroxycarboxylic acids can be usually prepared from lactide which is a cyclic dimer of lactic acid and a cyclic ester intermediate of hydroxycarboxylic acid (usually glycolide which is a dimer of glycolic acid). The preparation process has been disclosed in U.S. Pat. 3,636,956 and 3,797,499. When the polyester is prepared by direct dehydration polycondensation of lactic acid or lactic acid and other hydroxycarboxylic acids, azeotropic dehydration condensation of raw materials, that is, lactic acid or lactic acid and other hydroxycarboxylic acids is carried out preferably in the presence of an organic solvent and catalyst. The azeotropically distilled solvent is dehydrated and substantially anhydrous solvent is returned to the reaction system. Such process can provide high molecular weight polylactic acid and a copolymer of lactic acid and other hydroxycarboxylic acids which have practical strength (EP Publication 0572675).

As to preparation processes of aliphatic polyester from aliphatic polyhydric alcohols and aliphatic polybasic acids, a process for providing high molecular weight aliphatic polyester having practical strength has been disclosed in Japanese Laid-Open Patent Publication HEI 4-189822 and 4-189823.

Japanese Laid-Open Patent Publication SHO 62-25121 has disclosed a process for preparing high molecular weight polyglycolide or polylactide by addition of a phosphoric acid or phosphorus acid compound in the course of polycondensation. The addition decreases activity of a tin catalyst and inhibits decomposition of the polymer which takes place with the polycondensation reaction in the preparation process of polyglycolide or polylactide by direct polycondensation of glycolic acid or lactic acid in the presence of the tin catalyst. However, the weight average molecular weight of the polymer thus obtained is a few ten thousand at the highest (about 10,000 as a number average molecular weight), and hence, polymers which can endure practical use cannot be obtained by the method.

In these processes, the polymer obtained by melt polymerization is pelletized as intact and thus the catalyst used remains in the polymer. The residual catalyst is liable to cause a depolymerization reaction of the polymer due to heating in the later melt processing step and leads to a problem of causing deterioration of properties by a decrease in the molecular weight of the polymer. Further, monomers used as the raw material in these processes inevitably remain in an amount of several percents as unreacted materials in the polymer. It has also been known that lower boiling point impurities formed by the side reaction in the course of polymerization and low molecular weight volatile substances such as linear and cyclic oligomers remain in the polymer. The unreacted monomers and low molecular weight volatile substances which remain in the polymer lead to the deterioration of storage stability and processability of the polymer or, lead to a decrease in the strength of formed materials.

Consequently, the residual catalyst must be removed by purification in order to obtain an aliphatic polyester which has a sufficiently high molecular weight and does not contain the catalyst. For example, Japanese Laid-Open Patent Publication SHO 63-145327 has disclosed a process for dissolving a catalyst containing polymer in an organic solvent which is immiscible with water, and removing the catalyst by bringing the resultant solution into contact with water or an aqueous layer containing an inorganic acid, water soluble organic acid or water soluble complexing agent. The process, however, decreases contact efficiency for the aqueous layer when the polymer solution becomes viscous, and thus has a problem of requiring treatment with a dilute solution of the polymer having a concentration of 0.5–4.0% by weight or a problem of poor separation after mixing the organic solvent solution with the aqueous layer. Japanese Laid-Open Patent Publication SHO 63-254128 has disclosed a purification process by adding a precipitating agent to the polymer solution in a field of turbulent shear flow.

However, the process has poor efficiency for catalyst removal because catalyst removal and crystallization of the polymer are simultaneously conducted. Problems have also been found on application of the process in industry because of the need for specific equipment. The process for removing the catalyst from polyester derived from aliphatic polyhydric alcohols and aliphatic polybasic acids has not yet been known.

As to a process for reducing the content of unreacted monomers and low molecular weight volatile substances, Japanese Laid-Open Patent Publication SHO 62-64824 has disclosed a purification process of the polymer by reprecipitation after polymerization. In the process, the polymer is dissolved in a good solvent such as chloroform and the solution obtained is poured into a lean solvent such as methanol to precipitate the insoluble polymer alone and to remove the soluble monomer. The process, however, is unfavorable in industry because the steps are complex and additionally the yield of the polymer decreases.

Japanese Laid-Open Patent Publication HEI 3-14829 has described a process for preparing a bioabsorbable polyester by reaction of glycolide and/or lactide. The process can prepare polyester having a low content of unreacted monomers and residual low molecular weight volatile substances by treating the reaction system under reduced pressure in the second half of the polymerization reaction and after the end of the reaction while maintaining the polymer in a molten state. However, the polymer prepared by the process contains 0.3–0.9% of unreacted monomers and the active catalyst remains in the polymer. Thus, the polymer is insufficient in heat resistance and weatherability and cannot provide a formed product which is durable for a long period of use.

SUMMARY OF THE INVENTION

An object of the invention is to provide a purification process for removing cheaply and with ease in industry the low molecular weight compounds such as unreacted monomer and volatile substances which remain in the aliphatic polyester obtained by polycondensation reaction and to obtain the aliphatic polyester which has a low residual amount of the unreacted monomer and low molecular weight volatile substances and is excellent in heat resistance and weatherability.

As a result of an intensive investigation in order to solve the above problems, the present inventors have found that an aliphatic polyester which has a low content of a low molecular weight compound and is excellent in heat resistance and weatherability can be obtained by deactivating a catalyst, or by bringing an organic solvent solution of the aliphatic polyester into contact with an acid material to insolubilize and remove the catalyst in the aliphatic polyester while maintaining the aliphatic polyester in a molten or dissolved state, and successively conducting distillation or crystallization to remove the low molecular compound contained in the aliphatic polyester. Thus, the present invention has been completed.

That is, one aspect of the invention is a purification process of an aliphatic polyester obtained in the presence of a catalyst from (i) an aliphatic hydroxycarboxylic acid,
(ii) a cyclic ester of the aliphatic hydroxycarboxylic acid,
(iii) a combination of an aliphatic polyhydric alcohol and an aliphatic polybasic acid, or
(iv) a mixture of the compounds selected from the above from (i) to (iii), which comprises deactivating the catalyst, or insolubilizing and separating the catalyst while maintaining the aliphatic polyester in a molten or a dissolved state and successively removing a low molecular compound.

The present invention provides an aliphatic polyester which contains the deactivated catalyst or has a low content of the catalyst and the low molecular weight compound and is excellent in heat resistance and weatherability.

DETAILED DESCRIPTION OF PREFERRED EMBODIMENTS

Aliphatic polyester which can be used in the invention is a homopolymer or copolymer which is prepared from a hydroxycarboxylic acid or a cyclic ester of the hydroxy carboxylic acid, a polyester prepared by reacting an aliphatic polyhydric alcohol with an aliphatic polybasic acid, and a polyester prepared from a mixture of these raw materials.

These polymers are prepared by direct dehydration polycondensation of raw materials such as a hydroxycarboxylic acid, aliphatic polyhydric alcohol and aliphatic polybasic acid, or by ring-opening polymerization of a cyclic ester intermediate of hydroxycarboxylic acid in the presence of a catalyst, for example, by suitably using a copolymerizable monomer such as lactide which is a cyclic dimer of lactic acid, glycolide which is a dimer of glycolic acid and ε-caprolactone which is a cyclic ester of 6-hydroxycaproic acid.

Aliphatic polyester obtained by these processes preferably has a weight average molecular weight of 50,000 or more in order to have practical strength. Films and molded articles obtained by processing such aliphatic polyester exhibit satisfactory strength and toughness and can be applied as intact to uses such as containers.

The direct dehydration polycondensation is preferably carried out by azeotropic dehydration condensation of the raw materials such as the hydroxy carboxylic acid, aliphatic polyhydric alcohol and aliphatic polybasic acid in an organic solvent in the presence of the catalyst. The azeotropically distilled solvent is more preferably dehydrated and a substantially anhydrous solvent is returned to the reaction system. Such process can provide a high molecular weight aliphatic polyester.

Raw materials of hydroxycarboxylic acid and cyclic ester which can be used in the invention include, for example, lactic acid, glycolic acid, 3-hydroxybutyric acid, 4-hydroxybutyric acid, 4-hydroxyvaleric acid, 5-hydroxyvaleric acid 6-hydroxycaproic acid, lactide, glycolide and ε-caprolactone. When a molecule has an asymmetric carbon atom, D-isomer alone, L-isomer alone, and a mixture of D- and L-isomer that is, a racemic compound can also be used.

Polyhydric alcohol raw materials which can be used have aliphatic hydroxyl groups and include, for example, ethylene glycol, diethylene glycol, triethylene glycol, polyethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, polytetramethylene glycol, 1,4-cyclohexanedimethanol and 1,4-benzenedimethanol.

Polybasic acid raw materials have aliphatic carboxyl groups and include, for example, succinic acid, oxalic acid, malonic acid, glutaric acid, adipic acid, pimelic acid, suberic acid, azelaic acid, sebacic acid, undecanoic diacid, dodecanoic diacid, 1,4-phenylenediacetic acid and phenylsuccinic acid.

Preferred combinations of the polyhydric alcohol with the polybasic acid are those providing a polymer having melting point of 100° C. or more and include, for example, ethylene glycol and succinic acid, 1,4-butanediol and succinic acid, and 1,4-cyclohexanadimethanol and succinic acid. Polymers obtained from these combinations can be applied to uses such as microwave ovens which require heat resistance.

A catalyst is usually used in the preparation of polymer in the invention both by the direct condensation process and by the ring-opening polymerization process of the cyclic ester intermediate of hydroxycarboxylic acid.

Catalysts which can be usually used are metals, metal oxides and metal salts of the groups II, III, IV and V in the periodic table and include, for example, zinc powder, tin powder, aluminum, magnesium and other metals; antimony oxide, zinc oxide, tin oxide, aluminum oxide, magnesium oxide, titanium oxide and other metal oxides; stannous chloride, stannic chloride, stannous bromide, stannic bromide, antimony fluoride, zinc chloride, magnesium chloride, aluminum chloride and other metal halides; magnesium carbonate, zinc carbonate and other metal carbonates; stannous acetate, stannous octoate, stannous lactate, zinc acetate, aluminum acetate and other metal organic carboxylates; and tin trifluoromethanesulfonate, zinc trifluoromethanesulfonate, magnesium trifluorome thanesulfonare, tin methanesulfonate, tin p-toluenesulfonate and other metal organic sulfonates. Further catalysts include dibutyltin oxide and other organometal oxides of the above metals; titanium isopropoxide and other metal alkoxides of the above metals; diethylzinc and other alkyl metals of the above metals; DOWEX and AMBERLITE and other ion exchange resins; sulfuric acid, methanesulfonic acid, p-toluenesulfonic acid and other protonic acids. Metals and metal oxides are usually used as a catalyst in order to obtain a high molecular weight polymer. Metals and compounds of tin and zinc are preferred and tin metal and a tin compound are more preferred in view of a high polymerization velocity and a molecular weight polymer obtained.

The amount of the catalyst is 0.0001–10% by weight, preferably 0.01–5% by weight of the raw materials.

The ring-opening polymerization of the cyclic ester of hydroxycarboxylic acid is usually carried out without solvent and thus the polymer is in a molten state. On the other hand, the direct dehydration polycondensation is carried out in a solvent and thus the polymer is dissolved in the solvent.

The polymerized mass of the aliphatic polyester obtained by polymerization process contains several percents of unreacted raw materials, chain and cyclic oligomers and other low molecular weight compounds; an active catalyst used for the polymerization; and a solvent depending upon the polymerization processes.

The process of the invention deactivates the catalyst while maintaining the aliphatic polyester thus obtained in a molten or dissolved state or insolubilizes and separates the catalyst, and successively removes the low molecular weight compounds. The aliphatic polyester obtained by ring-opening polymerization contains the polymer in a molten state after finishing the polymerization and thus purification is more readily carried out in view of operations by deactivating the catalyst and successively removing the low molecular compounds. On the other hand, the aliphatic polyester obtained by direct dehydration polycondensation in a solvent is preferably purified by insolubilizing and separating the catalyst and successively removing the low molecular weight compounds.

Low molecular weight compounds include oligomers having a molecular weight of 500 or less and unreacted raw materials. Particularly, cyclic esters of hydroxycarboxylic acids, for example, lactide, glycolide and ε-caprolactone are preferably removed.

Exemplary processes for deactivating the catalyst in the invention include a process of using protonic acid as a catalyst and adding a basic compound to the aliphatic polyester obtained, and a process of using a metal compound as a catalyst and adding an acid to the aliphatic polyester after finishing polymerization. Metal compounds are usually used as a catalyst in order to obtain a high molecular weight polymer and thus the process for adding the acid is preferably used. Representative acids which can be used include, for example, sulfuric acid, phosphoric acid, phosphorous acid and pyrophosphoric acid. Phosphoric acid and pyrophosphoric acid are preferred in view of the effect and can be added directly or as a solution in a suitable organic solvent.

The amount of these compounds differs depending upon the acid used, the raw materials polymerized and the kind and concentration of the catalyst. In the case of phosphoric acid or pyrophosphoric acid, the amount is 1.00 equivalent or more, preferably 1.05–4.5 equivalents to the catalyst contained.

When the amount is lower than the above range, the contained catalyst cannot be completely deactivated and finally impairs the heat resistance and weatherability of the aliphatic polyester obtained. On the other hand, an amount of addition exceeding 4.5 equivalents no longer has an enhancement effect and is unfavorable in economy.

In order to deactivate the catalyst by bringing into contact with the acid, stirring is continued at a usual polymerization temperature for 0.5–20 hours, preferably for 1–10 hours, more preferably for 1–5 hours.

Solvents which can dissolve the aliphatic polyester can be used for treating the aliphatic polyester in the process of insolubilizing and separating the catalyst in the invention. Exemplary solvents which can be used include benzene, toluene, xylene and other hydrocarbons; acetone, methyl ethyl ketone, acetophenone and other ketones; methylene chloride, chloroform, 1,2-dichloroethane and other halogenated hydrocarbons; N,N-dimethylformamide, N,N-dimethylacetamide, dimethyl sulfoxide and other aprotic polar solvents; and diphenyl ether, anisole and other ethers. A mixture of various organic solvents can also be used. The concentration of the aliphatic polyester dissolved in the organic solvent is usually 3–50% by weight. However, no particular limitation is imposed upon the concentration so long as the solution of the aliphatic polyester can be stirred. When an organic solvent is used in the polymerization, the reaction mixture can be used as intact for the treatment after finishing the polymerization.

Acidic substances which can be used for insolubilizing and separating the catalyst include, for example, hydrogen chloride, sulfuric acid, nitric acid, phosphoric acid, pyrophosphoric acid and other inorganic acids; and methanesulfonic acid, p-toluenesulfonic acid and other organic sulfonic acids. Sulfuric acid, phosphoric acid and pyrophosphoric acid are preferred in the inorganic acids.

The amount of the acidic substance used is usually 1.00–10.0 equivalents, preferably 1.05–8.0 equivalents to the catalyst contained. When the amount is less than the above range, the effect for catalyst removal is liable to decrease. On the other hand, an amount more than 10.0 equivalents leads to problems such as deterioration of the polymer. Further, use of the acidic substance in excess exhibits no effect on the catalyst removal and additionally requires excess purification for removing the acidic substance in the later steps.

The treatment by the acidic substance is usually carried out in the temperature range of 0°–150° C. The temperature range, however, differs depending upon the acidic substance used. For example, in the case of sulfuric acid and organic sulfonic acids such as methanesulfonic acid and p-toluenesulfonic acid, the temperature range is 0°–60° C., preferably 10°–50° C. In the case of phosphorus base compounds such as phosphoric acid and pyrophosphoric acid, the temperature range is 20°– 150° C., preferably 50°–130° C. When the temperature is lower than the above range, the velocity of catalyst conversion to precipitate becomes slow. On the other hand, a temperature higher than the above range leads to deterioration of the polymer. Contact time of the acidic substance is adequately 0.1–24 hours, preferably 0.5–12 hours. A contact time less than 0.1 hour sometimes leads to insufficient removal of the catalyst. On the other hand, a contact time exceeding 24 hours results in deterioration depending upon the compound.

Contact of the acidic substance can be carried out by any method, that is, batchwise, semibatchwise and continuously.

After insolubilizing the catalyst, the aliphatic polyester solution contains residual acidic substance. The acidic substance sometimes decomposes the aliphatic polyester in the steps such as concentration for isolating the aliphatic polyester, and thus must be neutralized depending on successive operations, if desired. Neutralizing agents for the acidic substance are alkali metal and alkali earth metal carbonates such as sodium carbonate, potassium carbonate, calcium carbonate and magnesium carbonate. After finishing the neutralization, insoluble matter and the insolubilized catalyst are removed by filtration to obtain an aliphatic polyester solution which does not contain insoluble matter. The neutralizing agent is used in an amount sufficient to completely neutralize the acidic substance remaining in the aliphatic polyester solution. Neutralization is carried out for a time sufficient to react the acidic substance with the neutralizing agent. The neutralizing agent is added to the aliphatic polyester solution and stirred usually for 10 minutes or more, preferably 30 minutes or more. No particular limitation is placed upon the neutralization temperature.

Neutralization is usually carried out at the same temperature as the treatment temperature with the acidic substance.

After deactivating the catalyst or insolubilizing and removing the catalyst by these operations, the aliphatic polyester is isolated by removing the low molecular weight compounds. Removal of the low molecular weight compounds can be carried out, for example, by dissolving the aliphatic polyester in a solvent and cooling the solution to crystallize the aliphatic polyester, by adding a lean solvent to the aliphatic polyester solution and precipitating the aliphatic polyester in the form of crystals, and by distilling off the solvent and the low molecular weight compounds from the aliphatic polyester solution. The low molecular weight compounds are preferably removed by distillation.

In the present invention, distillation of the low molecular weight compound means distillation of the low molecular weight compound dissolved in the solvent and evaporation of the low molecular weight compound contained in the polymer.

Distillation conditions for isolating the aliphatic polyester depend upon the equipment for carrying out distillation. The distillation is usually carried out at 300° C. or less. When the aliphatic polyester maintained at too high temperature for a long time, the polyester is liable to decompose. Thus, a preferred temperature is 250° C. or less. On the other hand, when the temperature is too low, a prolonged time is required for distillation removal of the low molecular weight compounds. Thus, a preferred temperature is 120° C. or more. The pressure in the system depends upon the operation temperature and is usually 50 mmHg or less, preferably 10 mmHg or less, more preferably 5 mmHg or less.

The removal efficiency of the low molecular weight compounds contained in the aliphatic polyester can also be enhanced by ventilating an inert gas through the system in the distillation under reduced pressure. Exemplary inert gases include nitrogen, helium, neon and argon. Nitrogen is preferably used.

The time required for removing the low molecular weight compounds by distillation differs depending upon the kind of aliphatic polyester, distillation temperature, level of pressure reduction and distillation equipment. For example, the low molecular weight compounds in a homopolymer of L-lactic acid can be satisfactorily removed at 180°–200° C. for 5–6 hours under reduced pressure of 5 mmHg or less. When the distillation is carried out above 250° C., the low molecular weight compounds can be removed in an enhanced efficiency and distillation time can be reduced. However, too high a temperature is unfavorable because the polymer is liable to decompose. On the other hand, at a temperature lower than 120° C., it takes a long time to remove the low molecular weight compounds. Distillation time can be still more reduced by further reducing the distillation pressure and maintaining high vacuum.

These processes can provide the aliphatic polyester which contains the catalyst in a deactivated state, preferably, an amount of 100 ppm or less, more preferably 50 ppm or less and the low molecular weight compounds in a residual amount of 1% or less, and is excellent in heat resistance and weatherability.

EXAMPLE

The present invention will now be illustrated in detail by way of examples. However, these examples are not to be construed to limit the scope of the invention.

Physical properties in the examples were measured by the following method.

[Average molecular weight of polymer]

A weight average molecular weight of a polymer was measured by gel permeation chromatography under the following conditions using polystyrene as the reference.

Equipment: Shimadzu LC-lOAD

Detector: Shimadzu RID-6A

Column: Hitachi Chemical Co. GL-S350DT-5+ GL-S370DT-5

Solvent: Chloroform

Concentration: 1%

Amount of charge: 20 μl

Flow rate: 1.0 ml/min

[Content of low molecular weight compound]

Aliphatic polyester was dissolved in chloroform and measured by gas chromatography with a hydrogen flame ionization detector FID using a column of Silicone OV-210 (2 m×3 mmφ) at a column temperature of 140° C.

The low molecular weight compounds in the polymer was expressed in a unit of a weight %.

[Content of catalyst[

Measured by fluorescent X-ray spectroscopy

[Heat resistance test]

A 5% weight-loss temperature was measured with TG/DTA 220 (manufactured by Seiko Electronic Industry Co.) in the air at a temperature rising rate of 10° C./min.

[Weatherability test]

A press film having a thickness of 100 μm was prepared at 180° C. under pressure of 100 kg/cm². The film obtained was placed in a Suga Standard Sunshine Weather-O-Meter at 60° C. for 400 hours with a showering time of 18 minutes in a cycle of 120 minutes. Tensile strength of the film was measured before and after the test and a tensile strength retention at the break point was calculated.

Preparation Example 1

Into a thick-walled cylindrical stainless-steel polymerization vessel equipped with a stirrer, 10 kg of L-lactide, 20 g (0.2% by weight) of stannous octoate and 200 g (2% by weight) of lauryl alcohol were sealed, deaerated for 2 hours under vacuum and then replaced with nitrogen gas. The mixture was heated at 180° C. for 3 hours with stirring in a nitrogen atmosphere. The pressure in the polymerization vessel was reduced to 3 mmHg by gradually degassing with a vacuum pump by way of a venting tube and a glass receiver. After an hour from the start of degassing, the interior of the vessel was replaced by nitrogen. Poly L-lactic acid thus obtained was discharged from the bottom of the polymerization vessel in the form of a strand and cut into pellets. The polymer had an average molecular weight of 90,000, Sn content of 550 ppm, and a lactide content of 2.8% by weight.

Preparation Example 2

Pellets were prepared by carrying out the same procedures as described in Preparation Example 1 except that 10 kg of L-lactide was replaced by 8 kg of L-lactide and 2 kg of DL-lactide. Poly DL-lactic acid thus obtained had an average molecular weight of 70,000, Sn content of 600 ppm and a lactic content of 3.1% by weight.

Preparation Example 3

Pellets were prepared by carrying out the same procedures as described in Preparation Example 1 except that 10 kg of L-lactic acid was replaced by 8 kg of L-lactide and 2 kg of glycolide. A copolymer of L-lactide and glycolide thus obtained had an average molecular weight of 80,000, Sn content of 600 ppm, lactide content of 2.5% and a glycolide content of 0.5% by weight.

Preparation Example 4

After stirring 10 kg of 90% by weight of L-lactic acid at 150° C. for 3 hours under reduced pressure of 50 mmHg while distilling out water, 57.0 g of stannous chloride dihydrate was added and further stirred at 150° C. for 2 hours under reduced pressure of 30 mmHg to obtain an oligomer. To the oligomer, 21.1 kg of diphenyl ether was added and an azeotropic dehydration reaction was carried out at 150° C. under reduced pressure of 35 mmHg. Distilled solvent water was separated in a water separator and the solvent alone was returned to the reaction vessel.

After 4 hours, the solvent-returning line was connected so as to return the solvent to the reaction vessel after passing through a column packed with 4.6 kg of molecular sieve 3A. The reaction was further continued for 40 hours at 150° C. under reduced pressure of 35 mmHg. The polymer solution, thus obtained, contained polylactic acid having an average molecular weight of 120,000, 800 ppm of Sn (about 3200 ppm for the polymer) and 1.2% by weight of lactide (about 4.8% for the polymer).

Preparation Example 5

After stirring 5 kg of 90% by weight L-lactic acid and 0.6 g kg of 70% by weight of glycolic acid at 140° C. for 3 hours under reduced pressure of 50 mmHg while distilling out water, 22.4 g of stannous chloride dihydrate was added and further stirred at 150° C. for 3 hours under reduced pressure of 50 mmHg to obtain an oligomer. To the oligomer, 6 kg of diphenyl ether was added and refluxed for 50 hours at 140° C. under reduced pressure of 25 mmHg while returning the distilled solvent to the reaction vessel after passing through a column packed with molecular sieve 3A.

The polymer solution thus obtained contained the copolymer having an average molecular weight of 100,000, 1200 ppm of Sn (about 3040 ppm for the copolymer), 1.3% by weight of lactide (about 3.3% for the copolymer) and 0.2% by weight of glycolide (about 0.5% for the copolymer).

Preparation Example 6

An oligomer was prepared by heating 2.0 kg of ethylene glycol, 3.8 kg of succinic acid, 14.0 kg of diphenyl ether and 29.0 g of metallic tin powder with stirring at 130° C. for 7 hours under reduced pressure of 140 mmHg while distilling water out of the reaction system. An azeotropic dehydration was carried out on the oligomer at 140° C. for 8 hours under reduced pressure of 30 mmHg. A column packed with molecular sieve 3A was mounted on the reaction vessel so as to return the distilled solvent to the reaction vessel after passing through the column. The reaction was further continued with stirring at 130° C. for 50 hours under reduced pressure of 17 mmHg. A copolymer solution having an average molecular weight of about 120,000 was obtained. The copolymer solution was filtered to remove the metallic tin powder. The copolymer solution had a Sn content of 900 ppm.

EXAMPLE 1

After heat-melting 2 kg of poly L-lactic acid obtained in Preparation Example 1 at 180° C. in a nitrogen atmosphere, 1.65 g of pyrophosphoric acid (2.0 equivalents to divalent Sn) was added and stirred at 180° C. for an hour to deactivate the catalyst. The mixture was gradually degassed with a vacuum pump through a vent tube and a glass receiver while maintaining the same temperature. The pressure in the system was finely reduced to 3 mmHg and contained low molecular weight compounds were removed by distillation. After maintaining the reaction system under reduced pressure of 3 mmHg for 5 hours, the reaction vessel was substituted with nitrogen and poly L-lactic acid obtained was discharged in the form of a strand and cut into pellets. The polymer obtained had an average molecular weight of 90,000 which was equal to that of the original poly L-lactic acid.

The content of residual lactide in the polymer obtained was 0.2%. The polymer obtained had a 5% weight loss temperature of 320° C. in the heat resistance test. The press film obtained had a tensile strength of 600 kg/cm$^2$ before the weatherability test and a strength retention of 90% after 400 hours of the weatherability test.

EXAMPLE 2

The same treatment of poly L-lactic acid was carried out as described in Example 1 except that the low molecular weight compound was removed by distillation while bubbling nitrogen gas through a capillary tube from the bottom of the reaction vessel.

Poly L-lactic acid thus obtained had an average molecular weight of 90,000 which did not differ from the original molecular weight. The content of residual lactide in the polymer was 0.1%. The polymer obtained had a 5% weight loss temperature of 320° C. in the heat resistance test. The press film obtained had a tensile strength of 600 kg/cm$^2$ before the weatherability test and a strength retention of 95% after 400 hours of the weatherability test.

EXAMPLE 3

The same treatment of poly L-lactic acid was carried out as described in Example 1 except that pyrophosphoric acid was replaced by 1.4 g of 98% phosphoric acid (2.0 equivalents to divalent Sn).

Poly L-lactic acid thus obtained had an average molecular weight of 90,000 which did not differ from the original molecular weight. The content of residual lactide was 0.2%. The polymer obtained had a 5% weight loss temperature of 320° C. in the heat resistance test. The press film obtained had a tensile strength of 550 kg/cm$^2$ before the weatherability test and a strength retention of 90% after 400 hours of the weatherability test.

EXAMPLE 4

After heat-melting 2 kg of poly DL-lactic acid obtained in Preparation Example 2 at 180° C. in a nitrogen atmosphere, 1.65 g of pyrophosphoric acid (2.0 equivalent to divalent Sn) was added and stirred at 180° C. for an hour to deactivate the catalyst. The mixture was gradually degassed with a vacuum pump through a vent tube and a glass receiver while maintaining the same temperature. The pressure in the system was finally reduced to 3 mmHg and low molecular weight compounds were removed by distillation. After maintaining the reaction system under reduced pressure of 3 mmHg for 5 hours, the reaction vessel was substituted with nitrogen and poly DL-lactic acid obtained was discharged in the form of a strand and cut into pellets.

The copolymer obtained had an average molecular weight of 70,000 which did not differ from the original molecular weight. The content of residual lactide in the copolymer was 0.2%. The copolymer obtained had a 5% weight loss temperature of 310° C. in the heat resistance test. The press film obtained had a tensile strength of 530 kg/cm$^2$ before the weatherability test and a strength retention of 90% after 400 hours of the weatherability test.

EXAMPLE 5

After heat-melting 2 kg of the L-lactide/glycolide copolymer obtained in Preparation Example 3 at 180° C. in a nitrogen atmosphere, 1.8 g of pyrophosphoric acid (2.0 equivalents to divalent Sn) was added and stirred at 180° C. for an hour to deactivate the catalyst. Thereafter, the mixture was gradually degassed with a vacuum pump through a vent tube and a glass receiver while maintaining the same temperature. The pressure in the system was finally reduced to 3 mmHg and low molecular weight compounds were removed by distillation. After maintaining the reaction system under reduced pressure of 3 mmHg for 5 hours, the reaction vessel was substituted with nitrogen and the copolymer obtained was discharged in the form of a strand and cut into pellets.

The copolymer thus obtained had an average molecular weight of 80,000 which did not differ from the original molecular weight. The copolymer had a residual lactide and glycolide of 0.1% and 0.1%, respectively. The copolymer thus obtained had a 5% weight loss temperature of 320° C. in the heat resistance test. The press film obtained had a tensile strength of 590 kg/cm$^2$ before the weatherability test and a strength retention of 90% after 400 hours of the weatherability test.

EXAMPLE 6

After maintaining 4 kg of the poly L-lactic acid solution obtained in Preparation Example 4 at 150° C. in a nitrogen atmosphere, 2.4 g of pyrophosphoric acid (2.0 equivalents to divalent Sn) was added and stirred with heating for an hour to deactivate the catalyst. Thereafter, the temperature was raised to 180° C., and the mixture was gradually degassed with a vacuum pump through a venting tube and a glass receiver. The pressure in the system was finally reduced to 3 mmHg, and diphenyl ether solvent and contained low molecular weight compounds were removed by distillation. After maintaining the reaction system under reduced pressure of 3 mmHg for 5 hours, the reaction vessel was substituted with nitrogen and the polymer was discharged in the form of a strand and cut into pellets.

Poly L-lactic acid thus obtained had an average molecular weight of 120,000 which did not differ from the original molecular weight. The content of residual lactide in the polymer was 0.2%. The polymer obtained had a 5% weight loss temperature of 315° C. in the heat resistance test. The press film obtained had a tensile strength of 620 kg/cm$^2$ before the weatherability test and a strength retention of 90% after 400 hours of the weatherability test.

EXAMPLE 7

After heating 4 kg of the poly L-lactic acid solution obtained in Preparation Example 4 at 150° C. in a nitrogen atmosphere, 2.4 g of pyrophosphoric acid (2.0 equivalents to divalent Sn) was added and stirred at 150° C. for an hour to deactivate the catalyst. Thereafter, 4 kg of diphenyl ether was added to the solution and cooled to 40° C. to crystallize the polymer. The crystallized polymer was filtered, washed with isopropyl alcohol to remove the low molecular weight compounds, and dried to remove the solvent. Poly L-lactic acid was obtained in the form of powder.

The polymer obtained had an average molecular weight of 120,000 which did not differ from the original molecular weight. The content of residual lactide in the polymer was 0.1%. The polymer obtained had a 5% weight loss temperature of 320° C. in the heat resistance test. The process film obtained had a tensile strength of 600 kg/cm$^2$ before the weatherability test, and a strength retention of 95% after 400 hours of the weatherability test.

EXAMPLE 8

To a table-top kneader, 2 kg of poly L-lactic acid obtained in Preparation Example 1 was charged and melted at 180° C. in a nitrogen atmosphere. Thereafter 1.65 g of pyrophosphoric acid (2.0 equivalents to divalent Sn) was added and kneaded at 180° C. for an hour to deactivate the catalyst. The kneader was then cooled to 120° C. and gradually evacuated with a vacuum pump through a vent tube and a glass receiver. The pressure in the system was finally reduced to 3 mmHg to remove low molecular weight compounds by distillation. Poly L-lactic acid was solidified at a system temperature of 120° C., and the removal by distillation of the low molecular weight compounds was carried out under forced grinding of poly L-lactic acid in the table-top kneader. After maintaining the system at 120° C. for 8 hours under reduced pressure of 3 mmHg, the kneader was substituted with nitrogen and ground poly L-lactic acid was discharged.

Poly L-lactic acid thus obtained had an average molecular weight of 90,000 which did not differ from the original molecular weight. The content of residual lactide was 0.2%. The polymer obtained had a 5% weight loss temperature of 320° C. in the heat resistance test. The press film obtained had a tensile strength of 600 kg/cm$^2$ before the weatherability test and a strength retention of 90% after 400 hours of the weatherability test.

EXAMPLE 9

To a solution obtained by dissolving 0.5 kg of poly L-lactic acid of Preparation Example 1 in 4.5 kg of chloroform, 0.5 g of 98% sulfuric acid (2,2 equivalents to divalent Sn) was added and stirred at 25° C. for 6 hours. Thereafter 15.0 g of calcium carbonate was added and stirred at 25° C. for 30 minutes. The mixture was then filtered to remove the precipitated catalyst and other impurities. Chloroform solvent was distilled off from the filtrate under reduced pressure. Low molecular weight compounds were successively removed from the filtrate at 180° C. under reduced pressure of 3 mmHg. The remaining system was further heated at 180° C. for 5 hours under reduced pressure of 3 mmHg. The reaction vessel was substituted with nitrogen and the polymer was discharged in the form of a strand and cut into pellets.

The polymer obtained had an average molecular weight of 90,000 which did not differ from the original molecular weight. The polymer had a residual lactide content of 0.2% and a Sn content of 10 ppm. The polymer obtained had a 5% weight loss temperature of 320° C. in the heat resistance test. The press film obtained had a tensile strength of 610 kg/cm$^2$

EXAMPLE 10

After dissolving 0.5 kg of poly DL-lactic acid obtained in Preparation Example 2 in 4.5 kg of 1,2-dichloroethane, 0.5 g of 98% sulfuric acid (2,2 equivalents to divalent Sn) was added and stirred at 25° C. for 4 hours. Successively 15.0 g of calcium carbonate was added and stirred at 25° C. for 30 minutes. The mixture was filtered to remove the precipitated catalyst and other impurities and 1,2-dichloroethane solvent was distilled off from the filtrate under reduced pressure. Low molecular weight compounds were removed by finally reducing the internal pressure of the system to 3 mmHg at 180° C. After maintaining the reaction system at 180° C. for 5 hours under reduced pressure of 3 mmHg, the reaction vessel was substituted with nitrogen and the copolymer was discharged in the form of a strand and cut into pellets.

The polymer obtained had an average molecular weight of 70,000 which did not differ from the original molecular weight. The polymer also had a residual lactide content of 0.2% and a Sn content of 7 ppm. The polymer obtained had a 5% weight loss temperature of 310° C. in the heat resistance test. The press film obtained had a tensile strength of 540 kg/cm$^2$ before the weatherability test and a strength retention of 100% after 400 hours of the weatherability test. Thus, both heat resistance and weatherability were good.

EXAMPLE 11

After dissolving 0.5 kg of the L-lactide/glycolide copolymer obtained in Preparation Example 3 in 4.5 kg of chloroform, 0.6 g of 98% sulfuric acid (2.4 equivalents to divalent Sn) was added and stirred at 25° C. for 4 hours. Successively 20.0 g of calcium carbonate was added and further stirred at 25° C. for 30 minutes. The mixture was filtered to remove the precipitated catalyst and other impurities. The chloroform solvent was distilled off from the filtrate under reduced pressure. Low molecular weight compounds were removed by finally reducing the internal pressure of the system to 3 mmHg at 180° C. After maintaining the reaction system at 180° C. for 5 hours under reduced pressure of 3 mmHg, the reaction vessel was substituted with nitrogen and the copolymer was discharged in the form of a strand and cut into pellets.

The copolymer obtained had an average molecular weight of 80,000 which did not differ from the original molecular weight. The copolymer obtained had residual lactide and glycolide in the amounts of 0.1% and 0.1% respectively, and a Sn content of 10 ppm. The copolymer obtained had a 5% weight loss temperature of 315° C. in the heat resistance test. The press film obtained had a tensile strength of 580 kg/cm$^2$ before the weatherability test and a strength retention of 95% after 400 hours of the weatherability test. Thus, both heat resistance and weatherability were good.

EXAMPLE 12

After adding 3.0 kg of chloroform to 2.0 kg of the poly L-lactic acid solution obtained in Preparation Example 4, 2.7 g of 98% sulfuric acid (2.0 equivalents to divalent Sn) was added and stirred at 25° C. for 5 hours. Successively, 15.0 g of calcium carbonate was added and further stirred for 30 minutes. The mixture was filtered to remove the catalyst and other impurities. The solvent chloroform and diphenyl ether were distilled off from the filtrate under reduced pressure. Low molecular weight compounds were removed by finally reducing the internal pressure of the system to 3 mmHg at 180° C. After maintaining the reaction system at 180° C. for 5 hours under reduced pressure of 3 mmHg, the reaction vessel was substituted with nitrogen and the polymer was discharged in the form of a strand and cut into pellets.

The polymer obtained had an average molecular weight of 120,000 which did not differ from the original molecular weight. The polymer had a residual lactide content of 0.2% and a Sn content of 7 ppm. The polymer obtained had a 5% weight loss temperature of 320° C. in the heat resistance test. The press film obtained had a tensile strength of 600 kg/cm$^2$ before the weatherability test and a strength retention of 100% after 400 hours of the weatherability test. Thus, both heat resistance and weatherability were good.

EXAMPLE 13

After adding 3.0 kg of diphenyl ether to 2.0 kg of the poly L-lactic acid solution obtained in Preparation Example 4, 3.6 g pyrophosphoric acid (3.0 equivalents to divalent Sn) was added and stirred at 110° C. for 5 hours. The mixture was filtered to remove the insolubilized catalyst. Successively the filtrate was cooled to 40° C. to crystallize the polymer. The crystallized polymer was filtered, washed with isopropyl alcohol to remove adhered low molecular weight compounds and dried under reduced pressure to obtain powdery poly L-lactic acid.

The polymer obtained had an average molecular weight of 120,000 which did not differ from the original molecular weight. The polymer also had a residual lactide content of 0.1% and a Sn content of 8 ppm. The polymer obtained had a 5% weight less temperature of 320° C. in the heat resistance test. The press film obtained had a tensile strength of 600 kg/cm$^2$ before the weatherability test and a strength retention of 100% after 400 hours of the weatherability test. Thus, both heat resistance and weatherability were good.

EXAMPLE 14

After adding 3.75 kg of chloroform to 1.25 kg of the copolymer solution obtained in Preparation Example 5, 2.5 g of 98% sulfuric acid (2.0 equivalents to divalent Sn) was added and stirred at 25° C. for 5 hours. Successively, 15.0 g calcium carbonate was added and further stirred for 30 minutes. The mixture was filtered to remove the deposited catalyst and other insoluble substances. The solvents, chloroform and diphenyl ether, were distilled off from the filtrate under reduced pressure. Low molecular weight compounds were removed by finally reducing the internal pressure of the system to 3 mmHg at 180° C. After maintaining the reaction system at 180° C. for 5 hours under reduced pressure of 3 mmHg, the reaction vessel was substituted with nitrogen and the copolymer was discharged in the form of a strand and cut into pellets.

The copolymer obtained had an average molecular weight of 100,000 which did not differ from the original molecular weight. The copolymer also had a residual lactide and glycolide content of 0.1% and 0.1%, respectively, and a Sn content of 10 ppm. The copolymer obtained had a 5% weight less temperature of 310° C. in the heat resistance test. The press film obtained had a tensile strength of 570 kg/cm$^2$ before the weatherability test and a strength retention of 95% after 400 hours of the weatherability test. Thus, both heat resistance and weatherability were good.

before the weatherability test and a strength retention of 100% after 400 hours of the weatherability test. Consequently, both heat resistance and weatherability were good.

EXAMPLE 15

After adding 3.0 kg of chloroform to 2.0 kg of the copolymer solution obtained in Preparation Example 6, 2.7 g of pyrophosphoric acid (2.0 equivalents to divalent Sn) was added and stirred at 60° C. for 5 hours. Successively, 15.0 g of calcium carbonate was added and further stirred at 60° C. for an hour. The mixture was filtered to remove the deposited catalyst and other insoluble substances. The solvents, chloroform and diphenyl ether, was removed from the filtrate by distillation under reduced pressure. Low molecular weight compounds were distilled off by finally reducing the internal pressure of the system to 3 mmHg at 180° C. Distillation of the low molecular weight compound ceased after heating at 180° C. for 5 hours under reduced pressure of 3 mmHg. Thereafter, the reaction vessel was substituted with nitrogen and the polymer was discharged in the form of a strand and cut into pellets.

The copolymer obtained had an average molecular weight of 120,000 which did not differ from the original molecular weight. The copolymer also had a Sn content of 7 ppm. The copolymer obtained had a 5% weight loss temperature of 300° C. in the heat resistance test. The press film obtained had a tensile strength of 350 kg/cm$^2$ before the weatherability test and a retention of 100% after 400 hours of the weatherability test. Thus, both heat resistance and weatherability were good.

Comparative Example 1

The same treatment as described in Example 1 was carried out except that 0.4 g of pyrophosphoric acid (0.5 equivalent to divalent Sn) was added.

Poly L-lactic acid obtained had an average molecular weight of 90,000 which did not differ from the original molecular weight. However, poly L-lactic acid had a residual lactide content of 0.3%. The polymer obtained had a 5% weight loss temperature of 280° C. in the heat resistance test. The press film obtained had a tensile strength of 600 kg/cm$^2$ before the weatherability test and a strength retention was reduced to 60% after 400 hours of the weatherability test. Thus, both heat resistance and weatherability were inferior to those of Example 1.

Comparative Example 2

The same treatment as described in Example 1 was carried out except that low molecular weight compounds were removed by distillation at 260° C.

Poly L-lactic acid obtained was dark brown colored and the average molecular weight was decreased to 40,000.

Comparative Example 3

The same treatment as described in Example 1 was carried out except that low molecular weight compounds were removed by distillation at 180° C. under reduced pressure of 20 mmHg.

Poly L-lactic acid obtained had an average molecular weight of 90,000 which did not differ from the original molecular weight. However, the residual lactide content was 1.5%. The polymer obtained had a 5% weight loss temperature of 280° C. in the heat resistance test. The press film had a tensile strength of 590 kg/cm$^2$ before the weatherability test and a strength retention of 70% after 400 hours of the weatherability test. Thus, both heat resistance and weatherability were inferior to those of Example 1.

Comparative Example 4

After heat-melting 2 kg of poly L-lactic acid obtained in Preparation Example 1 at 180° C. in a nitrogen atmosphere, the system was gradually degassed with a vacuum pump through a vent tube and a glass receiver. Low molecular weight compounds were distilled off by finally reducing the internal pressure of the system to 3 mmHg. After maintaining the pressure in the system at 3 mmHg for 5 hours, the reaction vessel was substituted with nitrogen and poly L-lactic acid was discharged in the form of a strand and cut into pellets.

Poly L-lactic acid obtained had an average molecular weight of 90,000 which did not differ from the original molecular weight. Poly L-lactic acid also had a residual lactide content of 0.7% and a Sn content of 560 ppm. The polymer obtained had a 5% weight loss temperature of 270° C. in the heat resistance test. The press film obtained had a tensile strength of 600 kg/cm$^2$ before the weatherability test. However, the strength retention was only 50% after 400 hours of the weatherability test. Thus, both heat resistance and weatherability were poor.

Comparative Example 5

After heat-melting 2 kg of the copolymer obtained in Preparative Example 2 at 180° C. in a nitrogen atmosphere, the system was gradually degassed with a vacuum pump through a vent tube and a glass receiver. Low molecular weight compounds were distilled off by finally reducing the internal pressure of the system to 3 mmHg. After maintaining the pressure in the system at 3 mmHg for 5 hours, the reaction vessel was substituted with nitrogen and the copolymer was discharged in the form of a strand and cut into pellets. The copolymer obtained had an average molecular weight of 70,000 which did not differ from the original molecular weight. The copolymer obtained had a residual lactide content of 0.6% and a Sn content of 560 ppm.

The copolymer obtained had a 5% weight loss temperature of 270° C. in the heat resistance test. The press film obtained had a tensile strength of 540 kg/cm$^2$ before the weatherability test. However, the strength retention was only 40% after 400 hours of the weatherability test. Thus, both heat resistance and weatherability were poor.

Comparative Example 6

After heat melting 2 kg of the copolymer obtained in Preparation Example 3 at 180° C. in a nitrogen atmosphere. The system was gradually degassed with a vacuum pump through a vent tube and a glass receiver. Contained low molecular weight compounds were distilled off by finally reducing the internal pressure of the system to 3 mmHg. After maintaining the pressure in the system at 3 mmHg for 5 hours, the reaction vessel was substituted with nitrogen and the copolymer was discharged in the form of a strand and cut into pellets. The copolymer obtained had an average molecular weight of 80,000 which did not differ from the original molecular weight. The copolymer obtained also had a residual lactide and glycolide content of 0.6% and 0.3%, respectively, and a Sn content of 615 ppm.

The copolymer obtained had a 5% weight loss temperature of 265° C. The press film obtained had a tensile strength of 570 kg/cm$^2$. However, the strength retention was only 50% after 400 hours of the weatherability test. Thus, both heat resistance and weatherability were poor.

Comparative Example 7

After heating 4 kg of the poly L-lactic acid solution obtained in Preparation Example 4 at 180° C. in a nitrogen atmosphere, the system was gradually degassed with a vacuum pump through a vent tube and a glass receiver finally to a reduced pressure of 3 mmHg while distilling off the diphenyl ether solvent and low molecular weight compounds. After maintaining the pressure in the system at 3 mmHg for 5 hours, the reaction vessel was substituted with nitrogen and the polymer was discharged in the form of a strand and cut into pellets.

Poly L-lactic acid obtained had an average molecular weight of 120,000 which did not differ from the original molecular weight. The polymer had a residual lactide content of 4.0% and a Sn content of 3300 ppm. The polymer obtained had a 5% weight loss temperature of 265° C. in the heat resistance test. The press film obtained had a tensile strength of 600 kg/cm$^2$ before the weatherability test. However, cracks were developed on the film after 400 hours of the weatherability test and the strength retention could not be measured. Thus, both heat resistance and weatherability were poor.

Comparative Example 8

The same treatment as described in Example 1 was carried out except that the low molecular weight compounds were distilled at 100° C. Poly L-lactic acid was solidified at 100° C. and thus treatment procedures were carried out without stirring. The treated product was discharged as intact. Poly L-lactic acid thus obtained had an average molecular weight of 90,000 which did not differ from the original molecular weight. However, the content of the residual lactide was varied from 2.1 to 5.9% depending upon the sampling portion.

We claim:

1. A purification process of an aliphatic polyester prepared in the presence of a catalyst from (i) an aliphatic hydroxycarboxylic acid, (ii) a cyclic ester of the aliphatic hydroxycarboxylic acid, (iii) a combination of an aliphatic polyhydric alcohol and an aliphatic polybasic acid, or (iv) a mixture of compounds selected from the above (i) to (iii), which comprises deactivating the catalyst or insolubilizing and separating the catalyst, while maintaining the aliphatic polyester in a molten or a dissolved state and successively removing a low molecular weight compound by distillation under reduced pressure.

2. The process of claim 1 wherein the distillation under reduced pressure is carried out at 120°–250° C.

3. The process of claim 1 wherein the distillation under reduced pressure is carried out at 5 mmHg or less.

4. The process of claim 1 wherein the catalyst is deactivated by bringing the aliphatic polyester into contact with a phosphoric acid or a phosphorus acid.

5. The process of claim 4 wherein the phosphoric acid is phosphoric acid or pyrophosphoric acid.

6. The process of claim 1 wherein the catalyst is insolubilized and separated by bringing the aliphatic polyester into contact with an acidic substance.

7. The process of claim 6 wherein the acidic substance is an inorganic acid or an organic sulfonic acid.

8. The process of claim 6 wherein the acidic substance is present in excess and is neutralized and the catalyst is successively insolubilized and separated.

9. The process of claim 1 wherein the aliphatic polyester is a homopolymer of the aliphatic hydroxycarboxylic acid of the cyclic ester of the aliphatic hydroxycarboxylic acid.

10. The process of claim 1 wherein the aliphatic polyester is a copolymer of the aliphatic hydroxycarboxylic acid or of the cyclic ester of the aliphatic hydroxycarboxylic acid.

11. The process of claim 9 wherein the aliphatic hydroxycarboxylic acid is lactic acid, glycolic acid or 6-hydroxycaproic acid.

12. The process of claim 10 wherein the aliphatic hydroxycarboxylic acid is a mixture of compound selected from lactic acid, glycolic acid and 6-hydroxycaproic acid.

13. The process of claim 1 wherein the polybasic acid is succinic acid and the aliphatic polyhydric alcohol is a diol selected from ethylene glycol and 1,4-butanediol.

14. The process of claim 1 wherein the catalyst is deactivated and removed prior to distillation under reduced pressure.

* * * * *